United States Patent [19]
Kelly

[11] Patent Number: 5,862,727
[45] Date of Patent: Jan. 26, 1999

[54] LASER ARBOR

[76] Inventor: Robert R. Kelly, 747 Bridge St., Grants Pass, Oreg. 97526

[21] Appl. No.: 814,442

[22] Filed: Mar. 10, 1997

Related U.S. Application Data

[60] Provisional application No. 60/013,244 Mar. 11, 1996.

[51] Int. Cl.[6] .............................. B26D 7/00; B27B 5/20; B27B 9/00
[52] U.S. Cl. .............................. 83/13; 83/520; 83/471.3; 83/490; 408/16; 451/6
[58] Field of Search .................... 83/520, 471.3, 83/521, 490, 13; 451/6; 362/89, 259, 287; 408/16

[56] References Cited

U.S. PATENT DOCUMENTS

| | | | |
|---|---|---|---|
| 4,469,931 | 9/1984 | Macken | 219/121 LG |
| 4,885,967 | 12/1989 | Bell et al. | 83/520 |
| 5,121,188 | 6/1992 | Patridge et al. | 357/74 |
| 5,285,708 | 2/1994 | Bosten et al. | 83/520 |
| 5,375,495 | 12/1994 | Bosten et al. | 83/520 |
| 5,446,635 | 8/1995 | Jehn | 83/521 |
| 5,461,790 | 10/1995 | Olstowski | 30/390 |

Primary Examiner—Maurina T. Rachuba
Assistant Examiner—Sean A. Pryor
Attorney, Agent, or Firm—William S. Lovell; Eric K. Karich

[57] ABSTRACT

A laser arbor is provided that will display a cutting line on a work piece to be cut by a rotary saw. The laser is operated by a centrifugal switch mounted within the laser arbor along with a laser diode or the like and a battery. Because of the rotation of the laser with the blade and the persistence of the human eye, the moving light spot from the laser appears as a single line, hence it is not necessary as in the prior art to produce light divergence in the plane parallel to the blade plane. For that purpose, it is preferable to employ a light source having a wavelength that lies in a region to which the eye is sensitive, which in practice will typically mean a wavelength in the upper region of the red. Placement of the laser inwardly from the cutting surface of the blade eliminates the danger of any damage occurring to the laser as a result of debris from the cutting process.

6 Claims, 2 Drawing Sheets

൧
LASER ARBOR

This application derives from copending Provisional Appl. Ser. No. 60/013,244 entitled "LASER ARBOR" filed Mar. 11, 1996 by Robert R. Kelly, who is also the inventor of the invention shown and described herein.

BACKGROUND OF THE INVENTION

Field of the Invention

This invention relates to methods and apparatus for visibly displaying lines on a work piece along which a cut is to be made in the operation of a rotary saw, and particularly to laser or like devices that are mounted adjacent the saw blade, rotate therewith, and are switched on by the radial acceleration produced in rotating the blade.

BACKGROUND INFORMATION

The semiconductor laser, because of its small size, convenient means for powering, and narrow beam, has found numerous applications for purposes of marking and measuring work pieces. Among such uses has been the drawing of a line on a work piece for purposes of positioning a cutting saw thereon. For example, the "Line-of-Cut Indicator" Model 7700 Miter Saw sold by Porter Cable under the trademark "LaserLoc®" (as described in the catalog therefor (Copyright 1995), p. 7, and also in U.S. Pat. Nos. 5,285,708 issued Feb. 15, 1994 to Bosten et al. and 5,375,495 issued Dec. 27, 1994 to Bosten et al.) includes a laser diode mounted within an upper guard that surrounds the rotary saw, the laser diode emitting a narrow beam (made fan-shaped by a lens that is divergent in the blade plane) past the rotary blade onto the work piece to serve as an alignment marker. Sensor lights are included which indicate that the laser light projection system is operative at any time that the saw as a whole is plugged into a power outlet and a power switch is turned on, or alternatively that because of overheating or the like the laser light projection system has been shut down. A similar device wherein a laser is mounted within a guard piece that surrounds a rotary saw blade is shown in U.S. Pat. No. 5,461,790 issued Oct. 31, 1995 to Olstowski, in which a power source for the laser diode is also evidently on at any time that power is provided to the associated saw, and which differs from the Bosten et al. devices in that the laser diode and hence alignment marker are disposed so as to be coplanar with the rotary saw blade. Both the Bosten et al. and Olstowski devices provide means for adjusting the position of the laser beam relative to the plane of the saw blade. (Another use of a laser diode in the sawing process is shown in U.S. Pat. No. 4,469,931 issued Sep. 4, 1984 to Macken, wherein partial cuts of the wood are made in advance of applying the saw so as to prevent chipping or splintering upon removal of the saw blade.)

The aforesaid devices that act to place a line of laser light onto a work piece as an alignment marker for guidance of a saw blade thereon have been designed as an integral part of the rotary saw structure with which those devices function. It would be useful, however, to provide such means that are not integral with the structure of the saw, but which for economic reasons could instead be retrofitted onto existing rotary saws. Also, inasmuch as laser light can present a substantial hazard to the eyes when operated (and looked at) continuously, it would be preferable that such light be emitted only when in actual use in the sawing process. Such a light-emitting device can also be further simplified if it is not necessary to provide divergence of the light beam in a plane parallel to the blade plane.

SUMMARY OF THE INVENTION

The invention comprises a laser arbor that attaches coaxially with the rotary saw blade onto the fitting to which the rotary blade is mounted and in lieu of the arbor that is ordinarily so used for mounting the blade. Included within the laser arbor are the laser diode itself, battery means for operating the laser diode, and a centrifugal switch that connects power from the battery to the laser diode only when the saw blade is rotating.

DETAILED DESCRIPTION OF THE INVENTION

Figure 1:
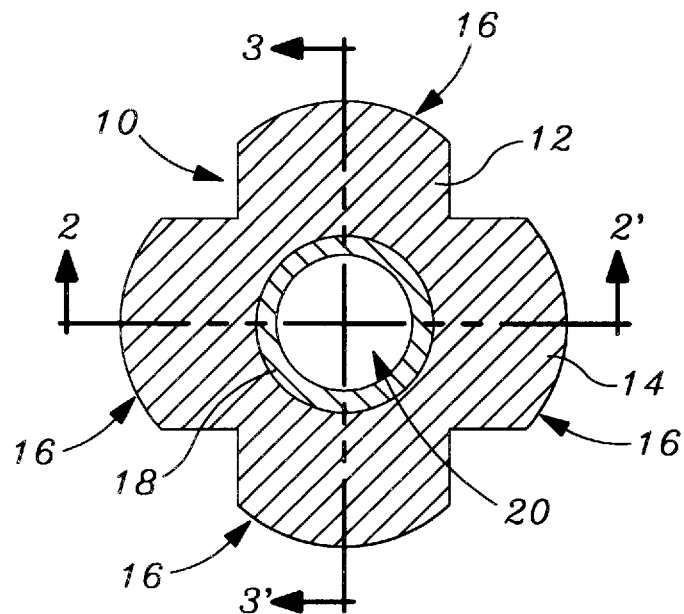
FIG. 1 is a top plan view of the laser arbor comprising the invention.

FIG. 1 is a top plan view of a laser arbor 10 that embodies the invention and can be described in terms of arms 12 and 14 disposed mutually orthogonally in a "+" configuration and each terminating in rounded ends 16. Laser arbor 10 further includes a central, toroidal depression 18 that serves to accommodate a washer as will be described hereinafter. Contiguous to and coaxial with the interior boundary of depression 18 is a bolt aperture 20 that serves to mount laser arbor 10 onto a rotary saw in the usual manner of mounting a saw blade to a rotary saw. In operation, laser arbor 10 may be considered as being rotated in the direction of the arrow in FIG. 1.

Figure 2:
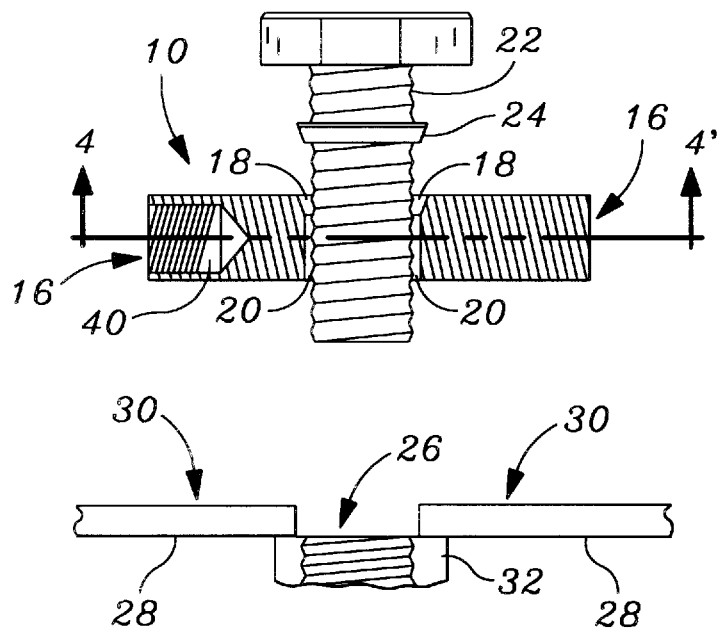
FIG. 2 is a cross-sectional view of the laser arbor of FIG. 1 taken along the lines 2–2' of FIG. 1, also showing the manner of connecting the laser arbor to the saw blade.

FIG. 2 is a cross-sectional drawing of laser arbor 10 taken through lines 2–2' of FIG. 1, also showing the manner in which laser arbor 10 is attached to a rotary saw, i.e., in a plane near to and parallel to the blade plane. In addition to laser arbor 10 and the components thereof as previously noted, FIG. 2 shows in dimmer outline several components of a rotary saw (not a part of the invention) to which laser arbor 10 may be attached. That is, a bolt 22 passes first through a beveled washer 24 and then through bolt aperture 20 of laser arbor 10 and center hole 26 of rotary blade 28 in the direction of arrows 30 so as to enter the particular threaded structure 32 that may have been provided in a particular type of saw for mounting the saw blade thereon. Toroidal depression 18 of laser arbor 10 is sized to accommodate beveled washer 24, which allows laser arbor 10 to be attached to a range of different specific types and brands of saw. It should be appreciated, of course, that other specific means for mounting laser arbor 10 in a plane near to and parallel to the blade plane could be provided, the apparatus just described being exemplary only. (The nature and purpose of element 40 of FIG. 2 will be explained below.

Figure 3:
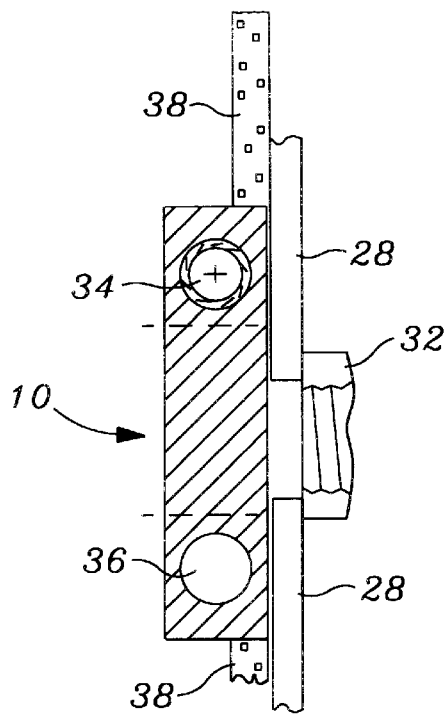
FIG. 3 is a cross-sectional view of the laser arbor of FIG. 1 that is orthogonal to that of FIG. 2 and is taken along the lines 3–3' of FIG. 1.

The result of mounting laser arbor 10 onto a saw blade so as to lie in a nearby plane is shown in FIG. 3, which is a different cross-section of FIG. 1, i.e., taken through the lines 3–3' of FIG. 1. (For simplicity in the drawing, only blade 28 and structure 32 of the saw are shown explicitly, and again dimly, in FIG. 3.). In this view, and as will be shown in greater detail in FIG. 4, there is shown near the top of FIG. 3 the rearward end of a laser diode 34 or the like, and near the bottom of FIG. 3 a battery compartment 36 for providing power to laser diode 34.

Figure 5:
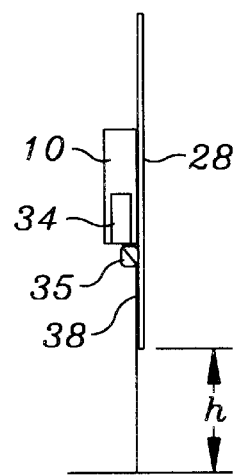
FIG. 5 is a view of a laser diode and rhomboidal lens assembly as contained within the laser arbor and oriented so as to place an alignment line derived therefrom within the plane of the blade of the saw.

Also shown in FIG. 3 is an alignment line 38 which, contrary to the Bosten et al. and Olstowski devices previously noted, is produced not by divergence of the laser beam using a lens (to constitute what is often referred to as a "line generator") but rather by the rotation of laser arbor 10 as shown, e.g., by the arrow in FIG. 1 (i.e., laser arbor 10 of FIG. 3 must actually rotate in order to produce line 38). As a consequence, the present invention does not require additional lenses to produce the fan-shaped beam required by the Bosten et al. and Olstowski devices, but instead uses a rhomboidal lens or the like to change the beam direction as shown in FIG. 5. Lens 35 which is disposed at the output of laser diode 34 diverts the beam therefrom onto the surface of blade 28 so as to continue parallel thereto. This is necessary since a beam at any angle to the blade plane would trace an arc on the surface of the work piece. Such a procedure also provides an additional safety advantage in that the beam as produced is not a fixed beam, the reflection of which into the eyes could present a hazard, but rather a rapidly fleeting beam that indeed becomes visible at all only because of the persistence of the eye.

Figure 4:
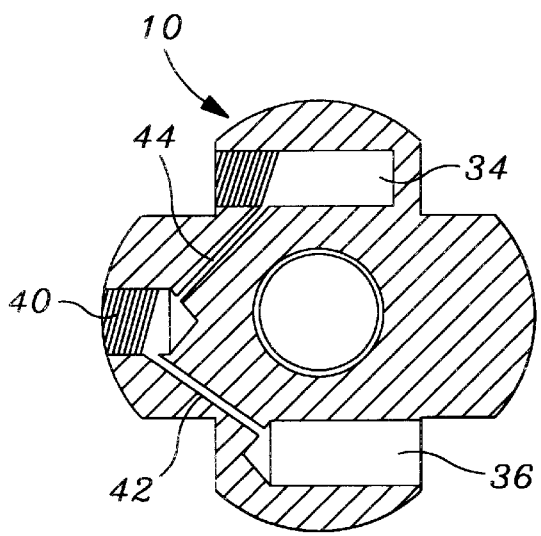
FIG. 4 is yet another cross-sectional view of the laser arbor of FIG. 1 that is orthogonal to the views of both FIGS. 2 and FIG. 3 and taken along the lines 4–4' of FIG. 2.
Figure 6:
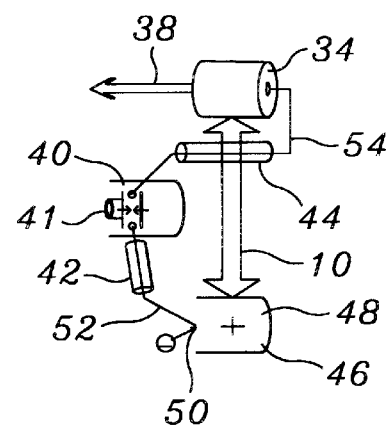
FIG. 6 is a circuit diagram of the interconnection through the laser arbor body of a battery, a laser diode, and an interconnecting centrifugal switch.

The manner of turning on the laser beam is shown in FIGS. 4 and 6, FIG. 4 being a cross-sectional view of laser arbor 10 taken from the lines 4–4' of FIG. 2. Laser diode 34 preferably has a modular design such as that described in U.S. Pat. No. 5,121,188 issued Jun. 9, 1992 to Patridge et al. for easy installation and replacement although, as noted earlier, other types of light source may also be employed. In particular, it is preferable to employ a laser diode of the type indicated but which operates in a wavelength region to which the eye is most sensitive, e.g., in the higher region of the red spectrum.

Battery compartment 36 is sized to accommodate a type of small, disk-shaped battery, preferably batteries not of a mercury type but instead may comprise a stack of 1.5 v. watch batteries such as the Eveready 389. As will be shown in more detail with reference to FIG. 6, centrifugal switch 40, when interconnected through first wire conduit 42 and second wire conduit 44, serves to control the electrical connection of power to laser diode 34 so as to control when it is or is not turned on.

FIG. 6 now shows the electrical connections necessary for such operation. A battery 46 (placed within battery compartment 36) has a conductive outer surface 48 that constitutes the positive battery terminal. Centrally located along the battery axis at one end thereof is a negative terminal 50, to which is connected a first wire 52 that passes through first wire conduit 42 and connects to one terminal of centrifugal switch 40. Second wire 54 connects to the second terminal of centrifugal switch 40 and passes through second wire conduit 44 to connect to an axially-located terminal of laser diode 34 for which the conductive outer surface thereof forms a second terminal as in the case of battery 46. Laser arbor 10, with which the outer surfaces of both battery 46 and laser diode 34 are in physical contact (as shown by the broad arrow of FIG. 6), must likewise be made of an electrically conductive material so that a complete circuit will exist between battery 46 and laser diode 34 at any time at which centrifugal switch 40 is closed. The rotation of laser arbor 10 as shown by the arrow of FIG. 1, which results from having turned on the saw to cause rotation of saw blade 28, causes centrifugal switch 40 to close to provide a voltage to laser diode 34 to turn it on and produce a beam that when rotated as indicated yields line 38. For purposes of testing the laser operation, external to centrifugal switch 40 is a small push button switch 41 that when pushed inwardly will also close the circuit from battery 46 to laser diode 34.

It will be understood by those of ordinary skill in the art that other arrangements and dispositions of the aforesaid components, the descriptions of which are intended to be illustrative only and not limiting, may be made without departing from the spirit and scope of the invention, which is to be identified and determined only from the following claims and the equivalents thereof.

I claim:

1. A laser arbor comprising:
   an electrically conductive planar structure having a central orifice and at least three open ended cavities that are disposed outwardly from said central orifice;
   a laser diode having a beam outlet end disposed within a first one of said cavities so as to direct said beam outlet end towards said open end of said cavity;
   a centrifugal switch disposed within a second one of said cavities in an outwardly directed manner and being electrically connected to said laser diode; and
   a battery disposed within a third one of said cavities and being electrically connected to said centrifugal switch, whereby rotation of said laser arbor closes said centrifugal switch so as to complete an electrical connection between said battery and said laser diode.

2. The laser arbor of claim 1 further comprising at least two wiring conduits passing therethrough respectively between said first and second cavities and between said second and third cavities.

3. The laser arbor of claim 2 further comprising at least two connecting wires that pass respectively through each of said at least two wiring conduits and connect respectively between said laser diode within said first cavity and said centrifugal switch within said second cavity, and between said centrifugal switch within said second cavity and said battery within said third cavity.

4. The laser arbor of claim 3 in combination with a rotary miter saw and attached blade, wherein said laser arbor is connected coaxially with said blade and in a plane parallel to the plane of said blade.

5. The laser arbor of claim 4 wherein said laser diode is disposed at an angle relative to a plane through said laser arbor, whereby said laser diode will produce a beam directed at an angle to said laser arbor plane.

6. A method of providing a visible alignment line on a work piece to be cut upon, comprising the steps of:
   providing a rotary miter saw having a blade;
   providing near to and parallel to said blade a laser that produces a narrow beam of coherent light directed on a path outwardly from a central axis of said blade when the blade is rotated; and
   rotating said blade, whereby said light beam is produced and likewise rotated so as to trace out an alignment line on said work piece.

* * * * *